United States Patent
Park et al.

(10) Patent No.: US 8,659,536 B2
(45) Date of Patent: Feb. 25, 2014

(54) DISPLAY MODULE HAVING HAPTIC FUNCTION

(75) Inventors: Won-Sang Park, Yongin (KR); Jeong-Seok Oh, Yongin (KR); Min-Su Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 405 days.

(21) Appl. No.: 12/983,986

(22) Filed: Jan. 4, 2011

(65) Prior Publication Data

US 2011/0193802 A1    Aug. 11, 2011

(30) Foreign Application Priority Data

Feb. 10, 2010   (KR) .................. 10-2010-0012400

(51) Int. Cl.
*G06F 3/041*   (2006.01)

(52) U.S. Cl.
USPC .......................................... 345/102; 345/173

(58) Field of Classification Search
USPC ............. 345/102, 156–184; 178/18.01–18.11
See application file for complete search history.

(56) References Cited

U.S. PATENT DOCUMENTS

| | | | |
|---|---|---|---|
| 5,184,319 A | 2/1993 | Kramer | |
| 6,822,635 B2 | 11/2004 | Shahoian et al. | |
| 7,450,110 B2 | 11/2008 | Shahoian et al. | |
| 7,548,232 B2 | 6/2009 | Shahoian et al. | |
| 7,667,148 B2 | 2/2010 | Mansfield et al. | |
| 7,694,231 B2 | 4/2010 | Kocienda et al. | |
| 7,924,362 B2 * | 4/2011 | Slobodin | 349/58 |
| 8,174,511 B2 * | 5/2012 | Takenaka et al. | 345/177 |
| 8,310,452 B2 * | 11/2012 | Takenaka et al. | 345/173 |
| 2001/0035854 A1 | 11/2001 | Rosenburg et al. | |
| 2003/0128399 A1 | 7/2003 | Chino et al. | |
| 2006/0022952 A1 * | 2/2006 | Ryynanen | 345/173 |
| 2006/0192657 A1 | 8/2006 | Nishimura et al. | |
| 2006/0209037 A1 * | 9/2006 | Wang et al. | 345/173 |
| 2007/0035526 A1 * | 2/2007 | Takenaka et al. | 345/173 |
| 2007/0097073 A1 * | 5/2007 | Takashima et al. | 345/156 |
| 2008/0055277 A1 * | 3/2008 | Takenaka et al. | 345/177 |

(Continued)

FOREIGN PATENT DOCUMENTS

| JP | 2002341372 | 11/2002 |
|---|---|---|
| JP | 2003140269 | 5/2003 |

(Continued)

OTHER PUBLICATIONS

The Korean Office Action issued by Korean Patent Office on Apr. 19, 2011, corresponding to Korean Application No. 10-2010-0012400 and Request for Entry of the Accompanying Office Action attached herewith.

(Continued)

*Primary Examiner* — Dmitriy Bolotin
(74) *Attorney, Agent, or Firm* — Robert E. Bushnell, Esq.

(57) ABSTRACT

A display module having a haptic function includes a touch screen panel for detecting touch manipulation, a liquid crystal display (LCD) panel for realizing image display on the touch screen panel, a backlight unit comprising at least one light source for providing illuminating light to the LCD panel, and a haptic actuator disposed adjacent to the light source for providing a haptic effect. The display module having a haptic function has improved space effectiveness, and is easily miniaturized and thinned.

18 Claims, 7 Drawing Sheets

(56) References Cited

U.S. PATENT DOCUMENTS

| | | |
|---|---|---|
| 2008/0062139 A1* | 3/2008 | Hotelling et al. ............. 345/173 |
| 2008/0062148 A1* | 3/2008 | Hotelling et al. ............. 345/174 |
| 2008/0084384 A1 | 4/2008 | Gregorio et al. |
| 2008/0122315 A1* | 5/2008 | Maruyama et al. ............ 310/314 |
| 2008/0143559 A1* | 6/2008 | Dietz et al. ...................... 341/20 |
| 2009/0128376 A1* | 5/2009 | Caine et al. ...................... 341/34 |
| 2009/0250267 A1* | 10/2009 | Heubel et al. ............. 178/18.03 |
| 2009/0267902 A1 | 10/2009 | Nambu et al. |
| 2010/0045621 A1 | 2/2010 | Kang et al. |
| 2010/0048190 A1 | 2/2010 | Park et al. |
| 2010/0048194 A1 | 2/2010 | Park et al. |
| 2010/0048252 A1 | 2/2010 | Kang et al. |
| 2010/0048253 A1 | 2/2010 | Park et al. |
| 2010/0052880 A1* | 3/2010 | Laitinen et al. ............ 340/407.2 |
| 2010/0058470 A1 | 3/2010 | Kim |
| 2010/0066688 A1 | 3/2010 | Jeon |
| 2010/0073274 A1* | 3/2010 | Jung ............................. 345/102 |
| 2010/0075632 A1 | 3/2010 | Kim |
| 2010/0081470 A1 | 4/2010 | Lee et al. |
| 2010/0081502 A1 | 4/2010 | Rasmussen et al. |
| 2010/0093325 A1 | 4/2010 | Jang |
| 2010/0117975 A1 | 5/2010 | Cho |
| 2010/0120470 A1 | 5/2010 | Kim et al. |
| 2010/0156818 A1* | 6/2010 | Burrough et al. ............. 345/173 |
| 2011/0012845 A1* | 1/2011 | Rothkopf et al. ............. 345/173 |
| 2011/0037734 A1* | 2/2011 | Pance et al. .................... 345/177 |
| 2011/0043454 A1* | 2/2011 | Modarres et al. ............. 345/173 |
| 2011/0065480 A1* | 3/2011 | Kim et al. ..................... 455/566 |

FOREIGN PATENT DOCUMENTS

| | | |
|---|---|---|
| JP | 2007-86990 A | 4/2007 |
| JP | 2007-094993 | 4/2007 |
| JP | 2008186188 | 8/2008 |
| KR | 10-2006-0092070 A | 8/2006 |
| KR | 20080108651 A | 12/2008 |
| KR | 0907812 B1 | 7/2009 |

OTHER PUBLICATIONS

Japanese Office action issued on Jul. 3, 2012 by JPO in connection with Japanese Patent Application Serial No. 2010-252708, which also claims Korean Patent Application No. KR 10-2010-0012400 and Request for Entry of the Accompanying Office Action attached herewith.

Korean Registration Determination Certificate issued by KIPO on Nov. 29, 2011, corresponding to KR 10-2010-0012400 and Request for Entry attached herewith.

* cited by examiner

DISPLAY MODULE HAVING HAPTIC FUNCTION

CLAIM OF PRIORITY

This application makes reference to, incorporates the same herein, and claims all benefits accruing under 35 U.S.C. §119 from an application earlier filed in the Korean Intellectual Property Office on 10 Feb. 2010 and there duly assigned Serial No. 10-2010-0012400.

BACKGROUND OF THE INVENTION

1. Field of the Invention

The present invention relates to a display module and, more particularly, to a display module having a haptic function.

2. Description of the Related Art

A significant amount of the core research by inventors of electronic devices has been conducted for the purpose of improving a user interface. Conventional devices use visual or auditory signals in order to provide feedback to users. However, recently, research has been conducted on tactile feedback known as haptic for an improved user interface. The haptic effect is the sense from a fingertip touch that people feel when touching an object, and includes tactile feedback which can be felt when the skin contacts a surface of the object and a kinesthetic force feedback (hereinafter referred as "force feedback") which can be felt when a movement of a joint and a muscle is disturbed. In order to provide such a haptic effect, a haptic actuator, such as a vibration device, is necessary, and a separate installation space for the haptic actuator needs to be ensured. In particular, the installation space for the haptic actuator is limited in a mobile device which needs to be miniaturized and thinned.

SUMMARY OF THE INVENTION

The present invention provides a display module having a haptic function which is easily miniaturized and thinned, and provides space effectiveness.

According to an aspect of the present invention, there is provided a display module including a touch screen panel for detecting touch manipulation; a liquid crystal display (LCD) panel for realizing image display through the touch screen panel; a backlight unit, including at least one light source, for providing illuminating light to the LCD panel; and a haptic actuator disposed adjacent to the at least one light source for providing a haptic effect.

The backlight unit may include a light guide plate having one side surface used as a light receiving surface facing the light source, wherein light input through the light receiving surface is emitted toward a plate surface of the LCD panel. In this case, the haptic actuator may be disposed so as to face the light receiving surface.

For example, the display module may further include at least two light sources arranged in a row so as to face the light receiving surface, wherein the haptic actuator is disposed between the at least two light sources.

The haptic actuator may include a piezoelectric device for generating a vibration effect.

For example, the display module may further include a haptic controller for outputting a driving signal to the haptic actuator. In this case, the haptic controller may be integrated into an LCD driver for driving the LCD panel. In addition, the haptic controller may be integrated into a controller for driving the touch screen panel.

According to another aspect of the present invention, there is provided a display module including a touch screen panel for detecting touch manipulation; a liquid crystal display (LCD) panel for realizing image display on the touch screen panel; a backlight unit for providing illuminating light to the LCD panel; a frame for providing an internal installation space for accommodating the touch screen panel, the LCD panel, and the backlight unit; and a haptic actuator disposed adjacent to an edge of the frame for providing a haptic effect.

For example, the frame may have a rectangular shape, including long side portions extending parallel to each other, and short side portions extending from the long side portions and connecting the long side portions to each other. In this case, the haptic actuator may be disposed adjacent to the long side portion. For example, a light source of the backlight unit may be disposed adjacent to the short side portion.

As a further example, the frame may include upper and lower frames which are disposed so as to face each other, wherein the touch screen panel, the LCD panel, and the backlight unit are interposed between the upper and lower frames. In this case, the haptic actuator may be disposed between the lower frame and the backlight unit supported by the lower frame.

The display module may further include a haptic controller for outputting a driving signal to the haptic actuator. The haptic controller may be integrated into an LCD driver for driving the LCD panel. The haptic controller may be integrated into a controller for controlling the touch screen panel.

According to another aspect of the present invention, there is provided a display module including a touch screen panel driven by a controller for detecting touch manipulation; a liquid crystal display (LCD) panel driven by an LCD driver for realizing image display through the touch screen panel; and a backlight unit for providing illuminating light to the LCD panel; wherein the controller and the LCD driver are interposed between the touch screen panel and the LCD panel so that the touch screen panel and the LCD panel overlap each other; and wherein a haptic actuator for providing a haptic effect is interposed between the touch screen panel and the LCD panel.

For example, the controller, the LCD driver, and the haptic actuator may be disposed at different locations between the touch screen panel and the LCD panel.

The controller may be integrated into the LCD driver, and the haptic actuator may be disposed adjacent to the LCD driver.

According to another aspect of the present invention, there is provided a display module including a touch screen panel which is driven by a touch screen panel (TSP) controller for detecting touch manipulation; a liquid crystal display (LCD) panel which is driven by an LCD driver for realizing display image through the touch screen panel; a backlight unit for providing illuminating light to the LCD panel; and a haptic actuator driven by a haptic controller for providing a haptic effect; wherein the TSP controller, the LCD driver, and the haptic controller are integrated in a single driving chip.

According to the present invention, a display module has improved space effectiveness while providing a haptic effect by integrally installing a haptic actuator in a space of the display module. Thus, the haptic function may be used while installation space is not limited in a mobile device which needs to be miniaturized and thinned.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, the present invention will be described in detail by disclosing exemplary embodiments thereof with reference to the attached drawings.

Figure 1:
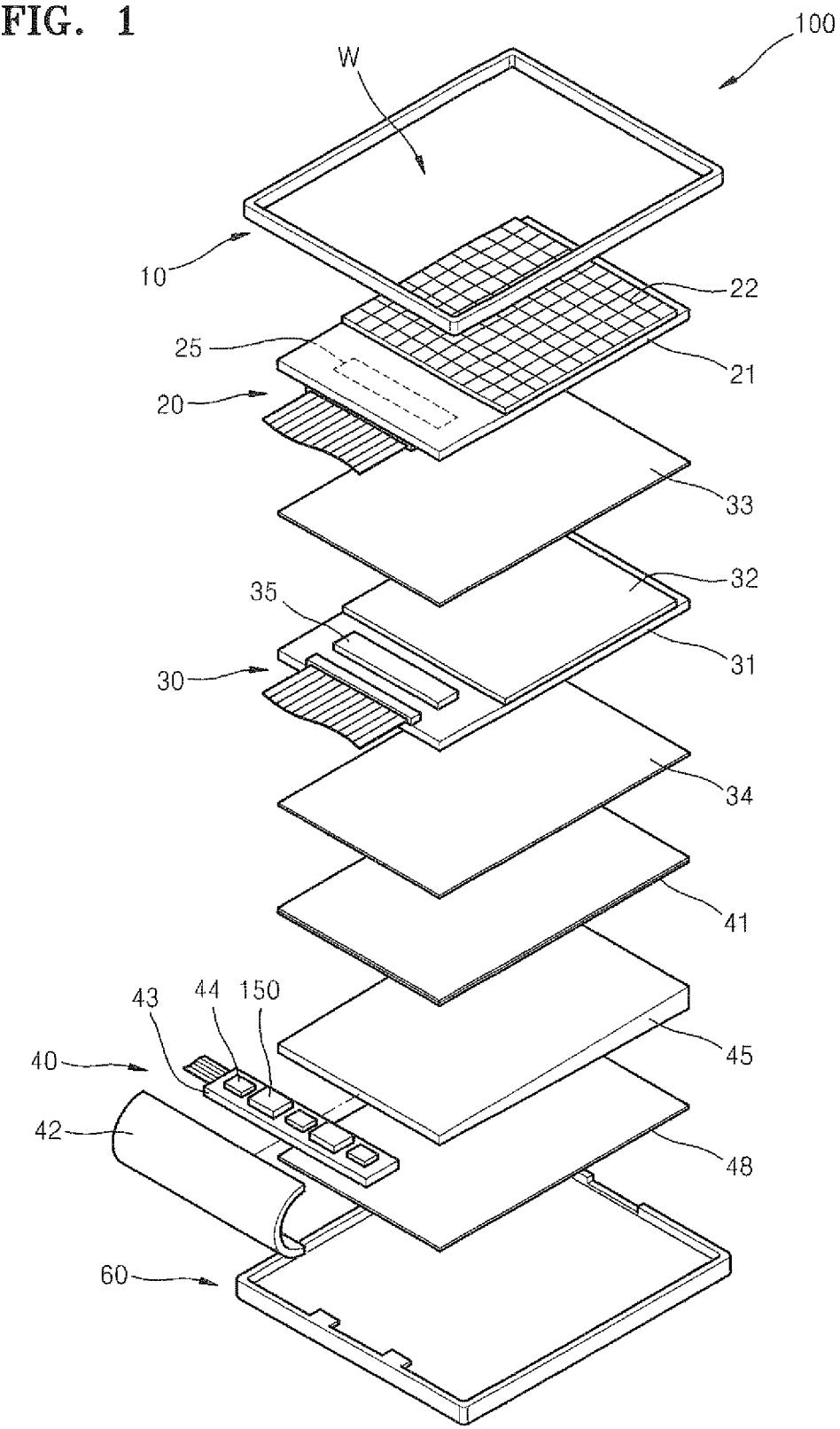
FIG. 1 is an exploded perspective view of a display module having a haptic function as an embodiment of the present invention.

FIG. 1 is an exploded perspective view of a display module 100 having a haptic function as an embodiment of the present invention.

Referring to FIG. 1, the display module 100 includes a touch screen panel 20, a liquid crystal display (LCD) panel 30 and a backlight unit 40, which are interposed between upper and lower mold frames 10 and 60 which are combined with each other.

The touch screen panel 20 is a device for generating a location signal based on a touch location where a user touches a touch surface, and includes an insulating substrate 21 on which touch electrodes 22 extend in horizontal and vertical directions so as to cross each other in the form of a mesh and maintain a predetermined voltage difference, and a touch screen panel (TSP) controller 25 for detecting an electrical touch portion based on a user's touch input and generating a sensing signal of a user by using a coordinate value based on horizontal and vertical axes. For example, haptic sensation, such as pulses or vibration, may be outputted by driving the haptic actuator based on the sensing signal of the touch screen panel 20.

The LCD panel 30 is a flat display device including an image display region for materially realizing image display, and includes a color filter (CF) substrate 32 for exhibiting predetermined colors while light is transmitted therethrough, a thin film transistor (TFT) substrate 31 on which TFTs and pixel electrodes are formed in a matrix arrangement, and an LCD driver 35 for driving the TFTs. Polarization plates 33 and 34 are attached to an upper surface of the CF substrate 32 and a lower surface of the TFT substrate 31, respectively. The LCD panel 30 is an example of a flat display device, but the present invention is not limited thereto, and various flat display devices may be used as the LCD panel 30. For example, an organic light emitting display panel may be used instead of the flat display device of the LCD panel 30.

A light-receiving type flat display device, such as the LCD panel 30, receives light from the outside to form an image, unlike a self light-emitting type flat display device which emits light to form an image. Thus, the light-receiving type flat display device includes the backlight unit 40 as an illuminating device. The backlight unit 40 may be classified into a direct light type backlight unit or an edge light type backlight unit according to the arrangement of light sources 44. A point light source, including a light-emitting unit having an approximately dot shape, or a line light source, including a light-emitting unit having a linear shape formed in a predetermined direction, may be used as the edge light type backlight unit.

For example, the backlight unit 40 includes light emitting diodes (LEDs) as the light sources 44, a light guide plate 45 for emitting light emitted from the light sources 44 of one side toward a plate surface of the LCD panel 30, a reflective sheet 48 disposed on a lower surface of the light guide plate 45 in order to prevent light from leaking through the lower surface of the light guide plate 45, and a diffusion sheet 41 disposed on an upper surface of the light guide plate 45 in order to diffuse light emitted from the light guide plate 45. The light sources 44 for providing light to the light guide plate 45 are installed on a circuit substrate 43, for example, a printed circuit board (PCB) or a flexible printed circuit board (FPCB), and are installed in a light source housing 42 formed so as to surround the light sources 44. Haptic actuators 150 are disposed between the light sources 44. For example, the haptic actuators 150 are disposed between the light sources 44 on the circuit substrate 43 on which the light sources 44 are installed.

The touch screen panel 20, the LCD panel 30, and the backlight unit 40 are supported by the upper and lower mold frames 10 and 60, respectively, and are interposed between the upper and lower mold frames 10 and 60, respectively, which are combined with each other, thereby constituting a single module unit. The upper and lower mold frames 10 and 60, respectively, are assembled so as to face each other and to provide an internal installation space for accommodating the touch screen panel 20, the LCD panel 30, and the backlight unit 40, and may have approximately rectangular shape. The upper mold frame 10 may have a rectangular edge shape, including a window 'W' formed in the center thereof in order to expose an image display surface of the LCD panel 30. The lower mold frame 60 may have a plate frame shape in order to stably support the backlight unit 40 at a rear surface of the display module 100. The upper and lower mold frames 10 and 60, respectively, may be molded products which are formed of synthetic resins, such as polycarbonate, by using an injecting molding method, or pressed products, such as aluminum thin plates.

Figure 2:
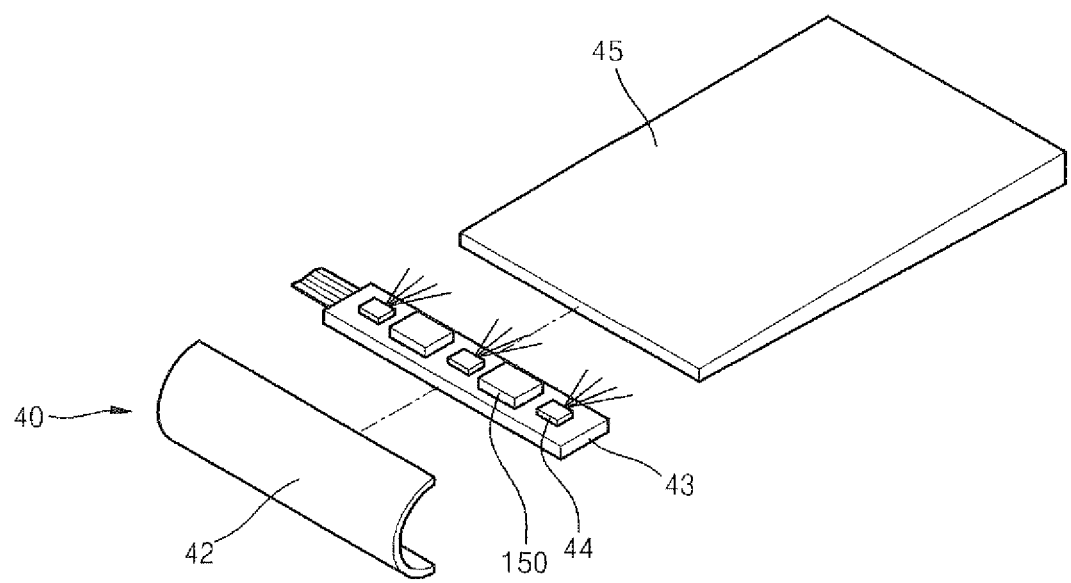
FIG. 2 is an enlarged view of a backlight unit of FIG. 1 as an embodiment of the present invention.

FIG. 2 is an enlarged view of the backlight unit of FIG. 1 as an embodiment of the present invention.

Referring to FIG. 2, the haptic actuators 150 are installed on the circuit substrate 43, for example, a PCB or an FPCB on which LEDs are installed as the light sources 44 of the backlight unit 40. For example, the light sources 44 may be arranged at regular intervals in a predetermined direction so as to have predetermined spaces therebetween, and the haptic actuators 150 may be installed in the spaces. In addition, the haptic actuators 150 provide user interfaces apart from visual and auditory user interfaces, and provide tactile feedback, such as vibration, texture or heat feedback, or kinesthetic force feedback, such as active or resistive force feedback. For example, various actuators, such as a piezoelectric device, a voice coil, or a solenoid, using various driving mechanisms may be used as the haptic actuators 150 for providing vibration feedback.

Figure 3:
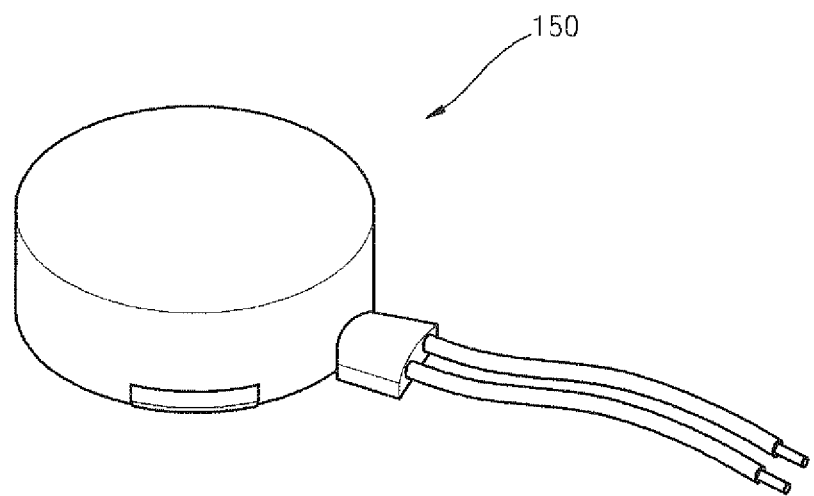
FIGS. 3 and 4 show piezoelectric devices as a haptic actuator as embodiments of the present invention.
Figure 4:
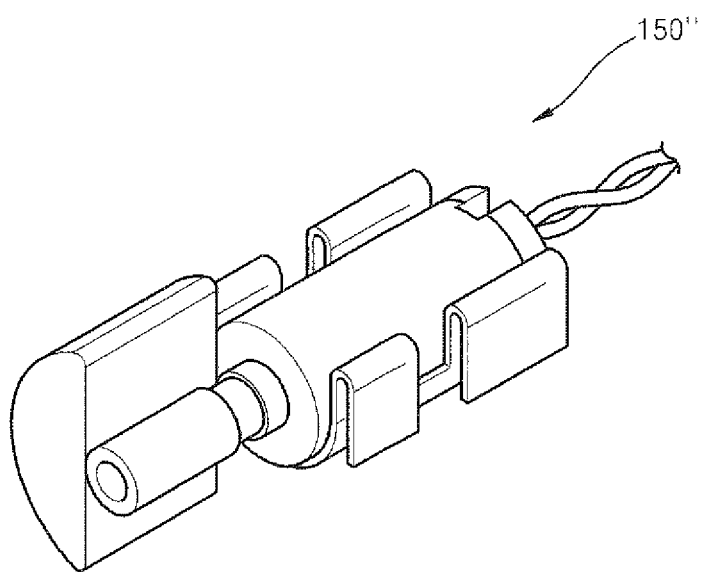

FIGS. 3 and 4 show piezoelectric devices as a haptic actuator as embodiments of the present invention.

For example, the haptic actuators 150' and 150" may provide click vibration for providing button touch according to a user's touch detected on the touch screen panel 20, or alarm vibration for signaling a predetermined event. The click vibration and the alarm vibration may be provided in a direction perpendicular to the touch screen panel 20 or another direction (in-plane direction).

As shown in FIG. 2, the haptic actuators 150' and 150" are installed in spaces between the light sources 44 of the backlight unit 40, thereby improving the space effectiveness of the display module 100. In particular, a mobile device such as a hand-held device may be miniaturized and thinned.

Figure 5:
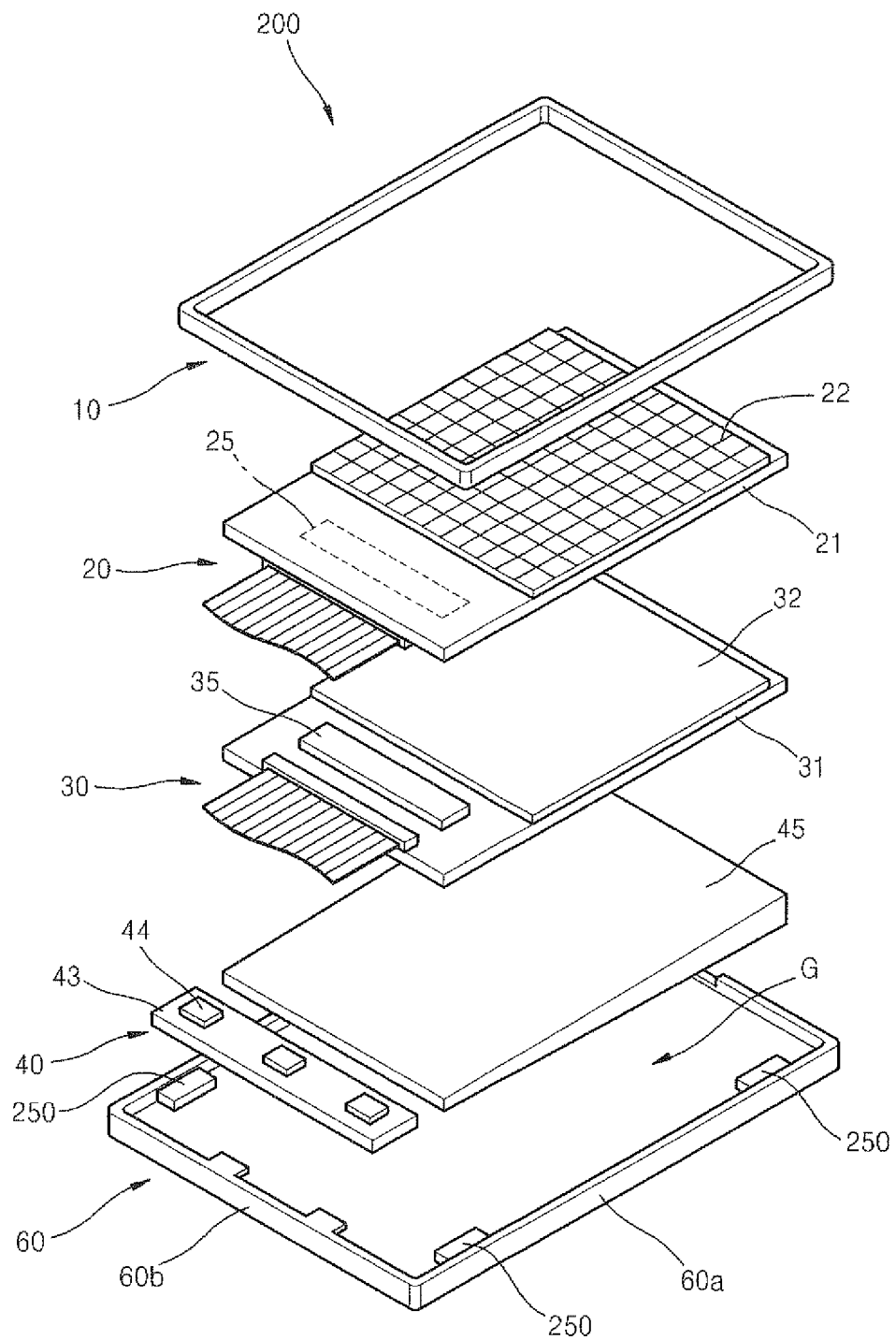
FIG. 5 is an exploded perspective view of a display module having a haptic function as another embodiment of the present invention.

FIG. 5 is an exploded perspective view of a display module having a haptic function as another embodiment of the present invention.

Referring to FIG. 5, the display module 200 includes the touch screen panel 20, the LCD panel 30, and the backlight unit 40 which are sequentially stacked and are interposed between the upper and lower mold frames 10 and 60, respectively, which are assembled so as to face each other in a vertical direction.

The touch screen panel 20, the LCD panel 30, and the backlight unit 40 are supported by the upper and lower mold frames 10 and 60, respectively, and are interposed between the upper and lower mold frames 10 and 60, respectively, which are combined with each other, thereby constituting a single module unit. The upper and lower mold frames 10 and 60, respectively, are assembled so as to face each other in order to provide an internal installation space for accommodating the touch screen panel 20, the LCD panel 30, and the backlight unit 40. The lower mold frame 60 has a rectangular frame shape having long side portions 60a extending parallel to each other, and short side portions 60b extending between the long side portions 60a in a direction perpendicular to the extending direction of the long side portions 60a and connecting the long side portions 60a to each other, and includes an accommodation space 'G' for accommodating the backlight unit 40 therein.

The backlight unit 40 is supported by the lower mold frame 60, and haptic actuators 250 may be disposed at edges of the lower mold frame 60. For example, the haptic actuators 250 may be disposed adjacent to the long side portions 60a of the lower mold frame 60, and the haptic actuators 250 may be disposed in spaces between the long side portions 60a of the lower mold frame 60 and the light guide plate 45. Since the light sources 44 of the backlight unit 40 are disposed adjacent to the short side portions 60b of the lower mold frame 60, the haptic actuators 250 may be disposed at the long side portions 60a of the lower mold frame 60 in a space which is more easily used than in the short side portions 60b.

The haptic actuators 250 are installed in spaces between the lower mold frame 60 for forming an external appearance and an internal structure accommodated in the lower mold frame 60, for example, the backlight unit 40, thereby improving the space effectiveness of the display module 200. In particular, a mobile device needs to be miniaturized and thinned, and thus the installation space for a haptic actuator is limited. However, according to the present embodiment, the size of the mobile device may not be increased even though the mobile device has the haptic function.

Figure 6:
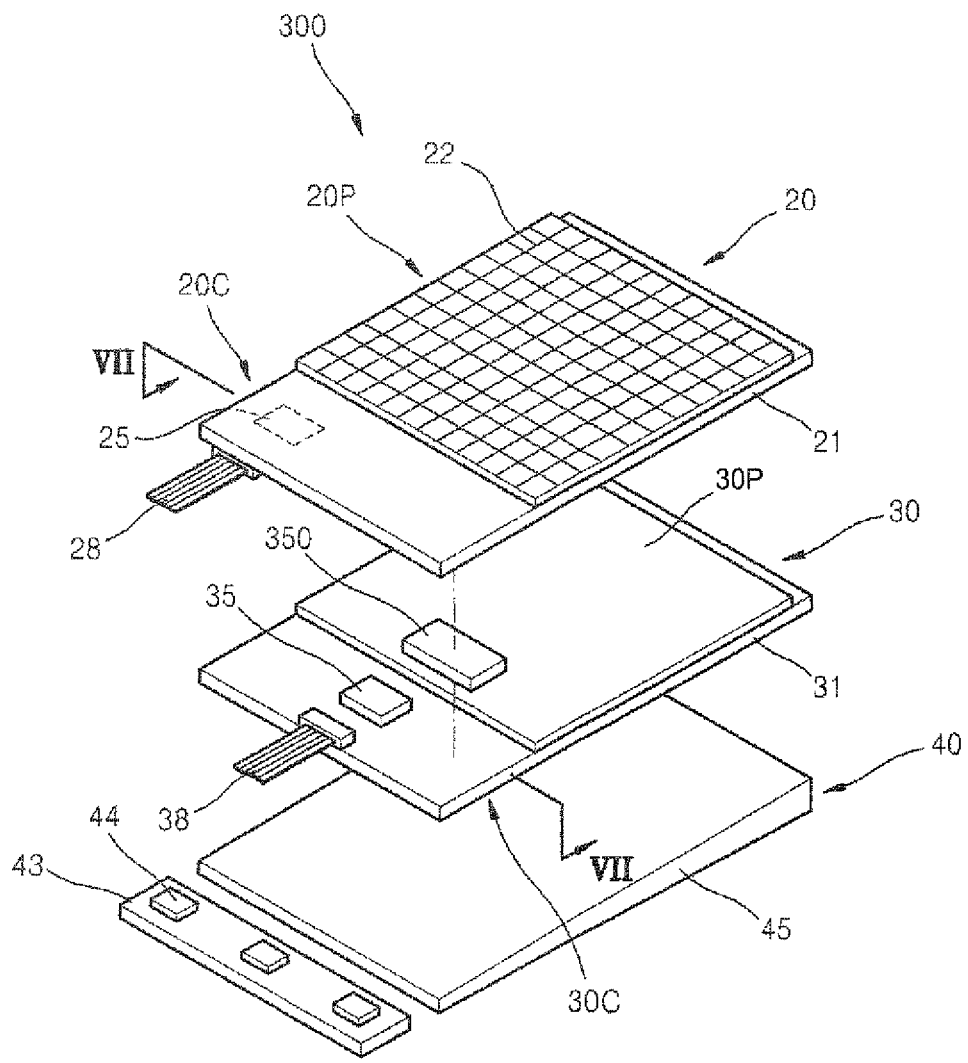
FIG. 6 is an exploded perspective view of a display module having a haptic function as another embodiment of the present invention.

FIG. 6 is an exploded perspective view of a display module having a haptic function as another embodiment of the present invention.

Referring to FIG. 6, the display module 300 includes the touch screen panel 20 for detecting a user's touch input, the LCD panel 30 for realizing image display, and the backlight unit 40 for illuminating the LCD panel 30, wherein the touch screen panel 20, the LCD panel 30, and the backlight unit 40 are sequentially stacked. The LCD panel 30 includes a display region 30P for realizing the image display, and a terminal region 30C formed around the display region 30P. The LCD driver 35 for driving the display region 30P is installed on the terminal region 30C. The LCD driver 35 converts a signal transmitted from a main processor (not shown) to an image signal having an appropriate form, and displays a desired image on the display region 30P. For example, the LCD driver 35 may be connected to a signal relaying wiring 38, such as an FPCB, and may function as a medium for transmitting signals between the LCD driver 35 and the main processor through the signal relaying wiring 38 having a side connected to the LCD driver 35 and the other side connected to the main processor.

The touch screen panel 20 includes a touch region 20P for inputting a user's touch input, and a terminal region 20C formed around the touch region 20P. A TSP controller 25 for receiving a signal from the touch region 20P so as to generate a sensing signal is installed on the terminal region 20C. For example, the touch region 20P may include touch electrodes 22 which are arranged in a matrix arrangement in horizontal and vertical directions in order to detect an user's touch location, and may be formed over an area corresponding to the display region 30P of the LCD panel 30. The TSP controller 25 may receive a signal output from the touch region 20P. Then, the TSP controller 25 may transmit received raw data to the main processor, or alternatively may convert the received raw data to a location coordinate signal having an appropriate form and transmit the location coordinate signal to the main processor. The TSP controller 25 may be connected to the main processor through signal relaying wiring 28, such as an FPCB, and may function as a medium for transmitting signals between the TSP controller 25 and the main processor through the signal relaying wiring 28 having a side connected to the TSP controller 25 and the other side connected to the main processor. For example, the TSP controller 25 may be installed on an opposite surface relative to a touch surface.

Figure 7:
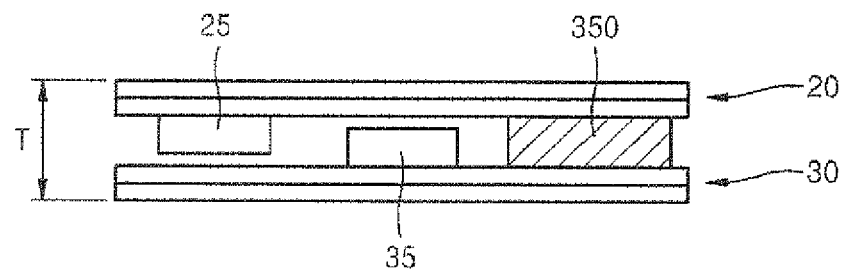
FIG. 7 is a cross-sectional view of the display module taken along a line VII-VII of FIG. 6 as another embodiment of the present invention.

FIG. 7 is a cross-sectional view of the display module taken along a line VII-VII of FIG. 6 as another embodiment of the present invention.

Referring to FIG. 7, the touch screen panel 20 and the LCD panel 30 are disposed so as to overlap each other. The touch screen panel 20 and the LCD panel 30 are assembled with respect to each other so that the TSP controller 25 and the LCD driver 35 face each other. In this case, the display module 300 may be thinned to a thickness T by assembling the TSP controller 25 and the LCD driver 35 so that the TSP controller 25 and the LCD driver 35 are alternately positioned rather than overlapping each other in the thickness direction. The TSP controller 25 and the LCD driver 35 are disposed between the touch screen panel 20 and LCD panel 30, and a haptic actuator 350 is interposed between the touch screen panel 20 and the LCD panel 30. For example, the haptic actuator 350 may be positioned adjacent to the LCD driver 35, and may be disposed so as to face the TSP controller 25 with respect to the LCD driver 35. The touch screen panel 20 and LCD panel 30 are assembled so as overlap each other, and the haptic actuator 350 is integrally disposed in a space by interposing a driving circuit (i.e., the TSP controller 25 and the LCD driver 35) between the touch screen panel 20 and LCD panel 30, thereby improving the space effectiveness of the display module 300. In particular, a mobile device needs to be miniaturized and thinned, and thus an installation space for the haptic actuator is limited. However, as the present embodiment, the size of the mobile device is not increased even though the mobile device has the haptic function.

Figure 8:
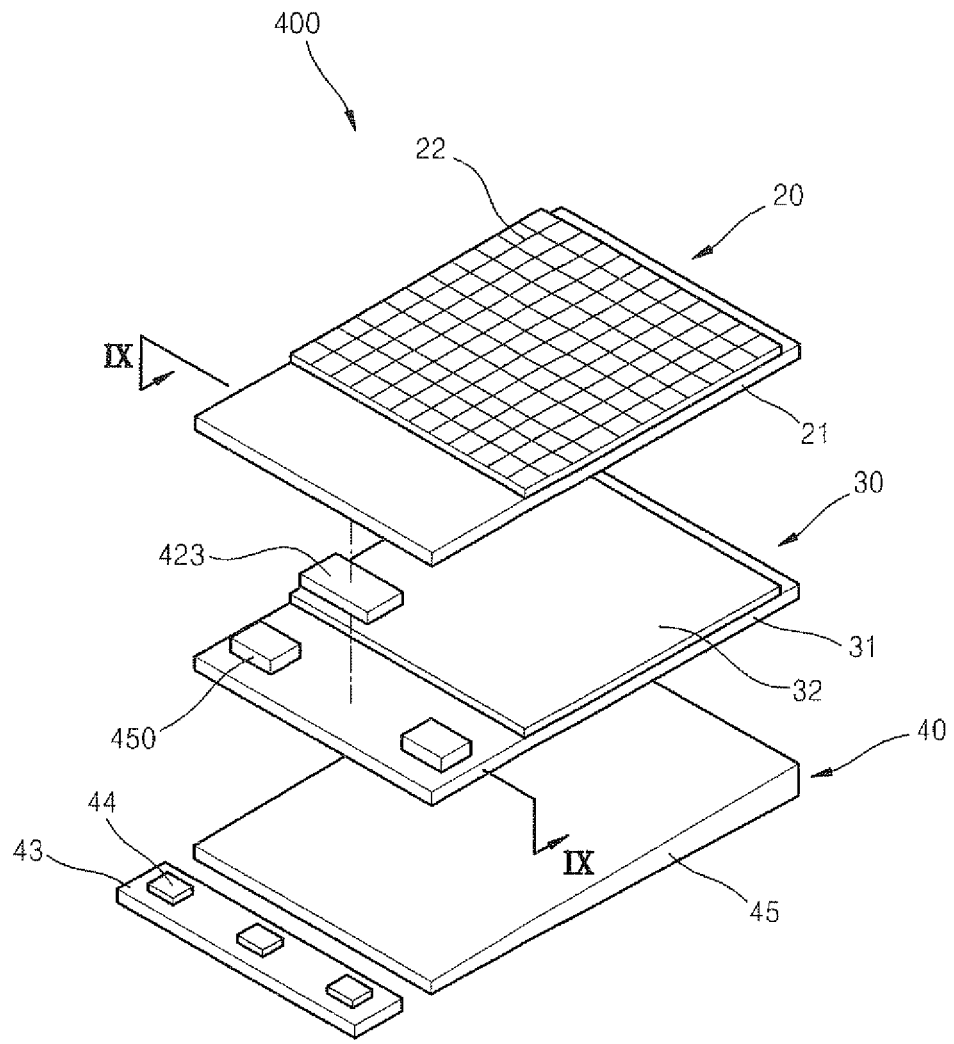
FIG. 8 is an exploded perspective view of a display module as another embodiment of the present invention.
Figure 9:
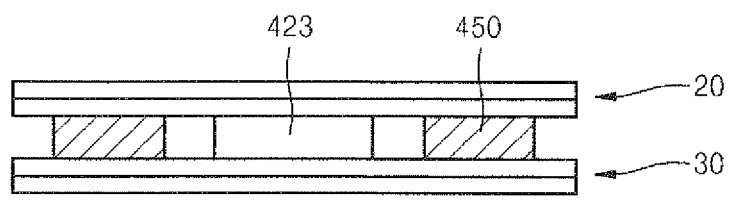
FIG. 9 is a cross-sectional view of the display module taken along a line IX-IX of FIG. 8 as another embodiment of the present invention.

FIG. 8 is an exploded perspective view of a display module as another embodiment of the present invention, while FIG. 9 is a cross-sectional view of the display module taken along a line IX-IX of FIG. 8 as another embodiment of the present invention.

Referring to FIGS. 8 and 9, in the display module 400, the touch screen panel 20 and the LCD panel 30 are assembled so as to overlap each other, and a combined controller 423 is interposed between the touch screen panel 20 and the LCD panel 30. The combined controller 423 controls the driving of the touch screen panel 20, and functions as a TSP controller for processing a signal output from the touch screen panel 20 and as an LCD driver for outputting an appropriate image signal to control the driving of the LCD panel 30. That is, the combined controller 423 is in charge of driving of the LCD panel 30 and the touch screen panel 20, and processes input/output signals of the LCD panel 30 and the touch screen panel 20.

A haptic actuator 450 is positioned adjacent to the combined controller 423, and is interposed between the touch screen panel 20 and the LCD panel 30. For example, the combined controller 423 is interposed approximately at a central location between the touch screen panel 20 and the LCD panel 30, and a pair of haptic actuators 450 may be disposed on both sides of the combined controller 423. The touch screen panel 20 and the LCD panel 30 are disposed so as to overlap each other, and the haptic actuator 450 is integrally disposed in a space by interposing a driving circuit (the combined controller 423) between the touch screen panel 20 and the LCD panel 30, thereby improving the space effectiveness of the display module 400. In particular, a mobile device needs to be miniaturized and its thickness reduced to make the finished mobile device "thin", and thus the installation space for the haptic actuator is limited. However, according to the present embodiment, the size of the mobile device may not be increased even though the mobile device is constructed to provide a haptic function.

According to the various embodiments of the present invention, as discussed above, the haptic actuators 150, 250, 350, and 450 are driven by a control signal from a haptic controller (not shown). The haptic controller may generate a driving signal to be outputted, and may output the driving signal in the form of a pulse width modulation (PWM) signal. For example, the haptic controller may generate a PWM driving signal according to a control signal of the main processor, and may receive the control signal of the main processor requesting a target duty ratio to generate an appropriate PWM driving signal. The haptic actuators 150, 250, 350, and 450 may provide vibration according to an oscillating condition requested by the PWM driving signal. For example, the PWM driving signal may request the oscillating frequency and/or vibration intensity of the haptic actuators 150, 250, 350, and 450. The haptic controller may be configured by combining the TSP controller 25 for controlling the driving of the touch screen panel 20 and/or the LCD driver 35 for controlling the driving of the LCD panel 30. The haptic controller may be integrated with the TSP controller 25 in the form of a single driving chip, may be integrated with the LCD driver 35 in the form of a single driving chip, or may be integrated with the TSP controller 25 and the LCD driver 35 in the form of a round chip.

Figure 10:
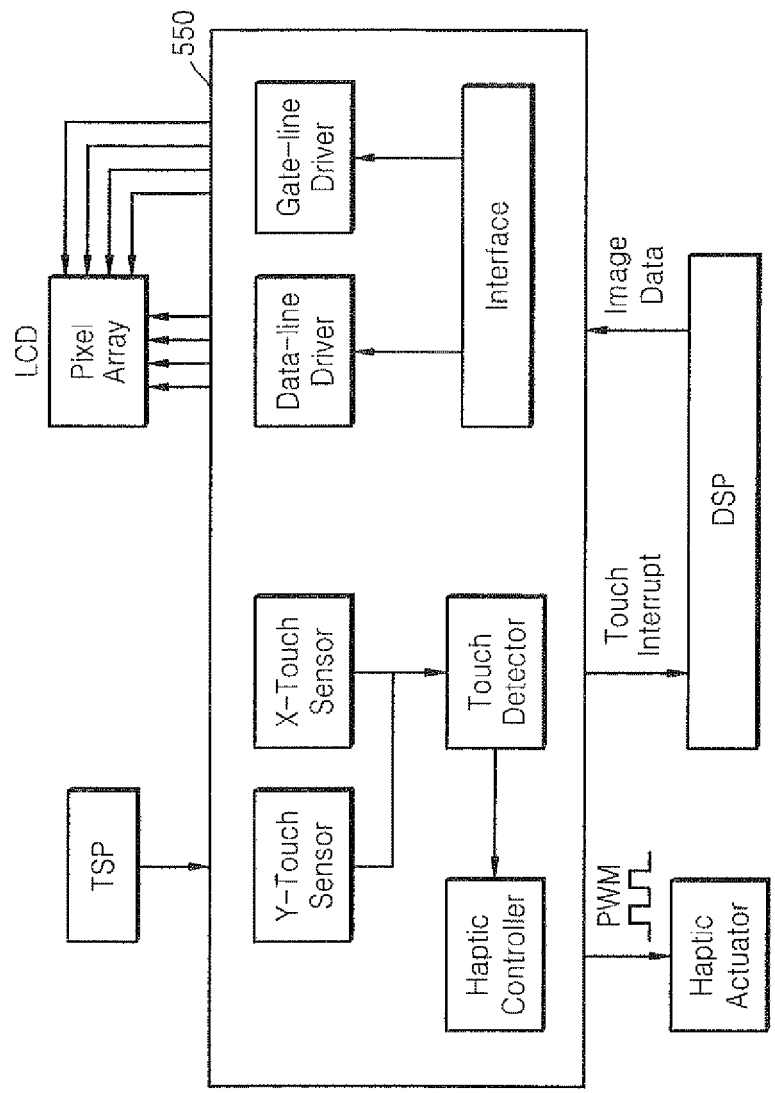
FIG. 10 is a block diagram depicting the internal structure of a combined controller as an embodiment of the present invention.

FIG. 10 is a block diagram depicting the internal structure of a combined controller as an embodiment of the present invention.

Referring to FIG. 10, the combined controller 550 detects a user's touch location based on a signal input to the touch screen panel (TSP), and includes an X-touch sensor and a Y-touch sensor for detecting the user's touch location in X and Y axis directions, respectively, on an X-Y plane, and a touch detector for collecting signals output from the X-touch sensor and the Y-touch sensor to generate a sensing signal. The touch detector may output a touch interrupt signal and a touch location signal to a digital signal processor (DSP) or directly to the haptic controller. The haptic controller may output a PWM driving signal to the haptic actuator.

The combined controller 550 drives an LCD panel, and includes an interface functioning as a medium of image data between the combined controller 550 and the DSP, and a gate-line driver and a data-line driver for driving a gate line and a data line, respectively, for defining a pixel array according to image data received from the DSP. The gate-line driver and the data-line driver may output the control signal with respect to a pixel array of the LCD panel and may output a predetermined image.

For example, the gate-line driver and the data-line driver may receive image data from the DSP, and may display on the LCD panel a menu image, including menu items to be selected by a user. The touch detector, detecting a human user's touch manipulation, transmits a sensing signal regarding a touch location to the DSP, and thus a menu item corresponding to the touch location is performed. In addition, the sensing signal is output to the haptic controller, and a touch button may be installed to allow manipulation, such as the user's touch with a finger tip, to activate click vibration.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A display module, comprising:
   a touch screen panel disposed to detect human touch manipulation;
   a liquid crystal display (LCD) panel providing a visual image display through the touch screen panel;
   a backlight unit comprising at least two light sources providing illuminating light to the LCD panel; and
   a haptic actuator disposed between said at least two light sources, providing a haptic effect.

2. The display module of claim 1, wherein the backlight unit comprises a light guide plate having one side surface used as a light receiving surface facing the light sources, and wherein light input through the light receiving surface is emitted toward a plate surface of the LCD panel.

3. The display module of claim 2, wherein the haptic actuator is disposed to face the light receiving surface.

4. The display module of claim 2, the at least two light sources arranged in a row so as to face the light receiving surface.

5. The display module of claim 1, wherein the haptic actuator comprises a piezoelectric device for generating a vibration effect.

6. The display module of claim 1, further comprising a haptic controller for outputting a driving signal to the haptic actuator.

7. The display module of claim 6, wherein the haptic controller is integrated into an LCD driver for driving the LCD panel.

8. The display module of claim 6, wherein the haptic controller is integrated into a controller for driving the touch screen panel.

9. A display module, comprising:
- a touch screen panel disposed to sense human touch manipulation;
- a liquid crystal display (LCD) panel for realizing image display on the touch screen panel;
- a backlight unit providing illuminating light to the LCD panel;
- a frame comprising upper and lower frames facing each other, the lower frame including a major bottom wall and a minor wall protruding from an edge of the major bottom wall, providing an internal installation space between the upper and lower frames for accommodating together the touch screen panel, the LCD panel, and the backlight unit; and
- a haptic actuator disposed on the major bottom wall of the lower frame and between the minor wall of the lower frame and the backlight unit, providing a haptic effect.

10. The display module of claim 9, wherein the frame has a rectangular shape comprising long side portions extending parallel to each other, and short side portions extending from the long side portions and connecting the long side portions to each other.

11. The display module of claim 10, wherein the haptic actuator is disposed adjacent to one of the long side portions.

12. The display module of claim 10, wherein a light source of the backlight unit is disposed adjacent to one of the short side portions.

13. The display module of claim 9, further comprising a haptic controller for outputting a driving signal to the haptic controller.

14. The display module of claim 13, wherein the haptic controller is integrated into an LCD driver for driving the LCD panel.

15. The display module of claim 13, wherein the haptic controller is integrated into a controller for controlling the touch screen panel.

16. A display module, comprising:
- a touch screen panel driven by a controller to sense human touch manipulation;
- a liquid crystal display (LCD) panel driven by an LCD driver providing a visual image display through the touch screen panel;
- a haptic actuator providing a haptic effect that is interposed between the touch screen panel and the LCD panel; and
- a backlight unit providing illuminating light to the LCD panel;
- the controller and the LCD driver interposed between the touch screen panel and the LCD panel so that the touch screen panel and the LCD panel overlap each other.

17. The display module of claim 16, wherein the controller, the LCD driver and the haptic actuator are disposed at different locations between the touch screen panel and the LCD panel.

18. The display module of claim 16, wherein the controller is integrated into the LCD driver, and wherein the haptic actuator is disposed adjacent to the LCD driver.

* * * * *